United States Patent
Kanwar et al.

[11] Patent Number: 5,984,109
[45] Date of Patent: *Nov. 16, 1999

[54] FILTER ASSEMBLY INCLUDING A DISPOSABLE CORELESS FILTER ELEMENT

[75] Inventors: Suri Kanwar, North Ridge; Z. Paul Akian, Los Angeles, both of Calif.

[73] Assignee: Western Filter Corporation, Valenica, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/835,266

[22] Filed: Apr. 8, 1997

Related U.S. Application Data

[63] Continuation-in-part of application No. 08/499,997, Jul. 10, 1995, abandoned.

[51] Int. Cl.$^6$ ........................................ B01D 35/30
[52] U.S. Cl. ..................... 210/440; 210/450; 210/458; 210/497.01; 210/493.2; 210/489; 210/496
[58] Field of Search .................... 210/315, 342, 210/437, 440, 441, 442, 450, 455, 457, 458, 489, 493.1, 493.2, 493.4, 497.01, 443, 444, 496

[56] References Cited

U.S. PATENT DOCUMENTS

| | | | |
|---|---|---|---|
| Re. 29,447 | 10/1977 | Farrow et al. | 210/232 |
| 930,401 | 8/1909 | Monteagle . | |
| 1,669,461 | 5/1928 | Gamble . | |
| 2,064,511 | 12/1936 | Wells | 210/165 |
| 2,401,222 | 5/1946 | Briggs | 210/62 |
| 2,420,414 | 5/1947 | Briggs | 210/169 |
| 3,189,179 | 6/1965 | McMichael | 210/238 |
| 3,261,473 | 7/1966 | Riede | 210/282 |
| 3,306,794 | 2/1967 | Humbert, Jr. | 156/69 |
| 3,308,956 | 3/1967 | Yee et al. | 210/232 |
| 3,386,583 | 6/1968 | Merten | 210/321 |
| 3,388,802 | 6/1968 | Wilkenson | 210/342 |
| 3,417,870 | 12/1968 | Bray | 210/321 |
| 3,457,339 | 7/1969 | Pall et al. | 264/249 |
| 3,486,626 | 12/1969 | Close | 210/232 |
| 3,498,464 | 3/1970 | Frosolone | 210/493.1 |
| 3,520,417 | 7/1970 | Durr et al. | 210/493 |
| 3,539,049 | 11/1970 | D'Eustachio et al. | 210/477 |
| 3,578,175 | 5/1971 | Manjikian | 210/489 |
| 3,767,054 | 10/1973 | Farrow et al. | 210/232 |
| 3,850,813 | 11/1974 | Pall et al. | 210/232 |
| 3,867,294 | 2/1975 | Pall et al. | 210/489 |
| 4,101,423 | 7/1978 | Merrill et al. | 210/494 M |
| 4,169,793 | 10/1979 | Lockshaw | 210/169 |
| 4,186,099 | 1/1980 | Henschel, Jr. et al. | 210/457 |
| 4,211,543 | 7/1980 | Tokar et al. | 55/485 |
| 4,214,612 | 7/1980 | de Putter | 138/144 |
| 4,218,324 | 8/1980 | Hartmann et al. | 210/493 R |
| 4,402,830 | 9/1983 | Pall | 210/457 |
| 4,419,234 | 12/1983 | Miller et al. | 210/232 |
| 4,660,779 | 4/1987 | Nemesi et al. | 242/7.02 |
| 4,663,041 | 5/1987 | Miyagi et al. | 210/493.2 |
| 4,686,038 | 8/1987 | Arnaud | 210/232 |
| 4,783,271 | 11/1988 | Silverwater | 210/742 |
| 4,839,037 | 6/1989 | Bertelsen et al. | 210/97 |
| 4,882,056 | 11/1989 | Degen et al. | 210/490 |
| 4,948,503 | 8/1990 | Baumann et al. | 210/232 |
| 5,006,242 | 4/1991 | Sato et al. | 210/232 |
| 5,015,375 | 5/1991 | Fleck | 210/232 |

(List continued on next page.)

FOREIGN PATENT DOCUMENTS

| | | |
|---|---|---|
| 0088148 | 3/1982 | European Pat. Off. . |
| 724242 | 7/1942 | Germany . |
| 3513062 | 10/1986 | Germany . |
| 53-2390 | 1/1978 | Japan . |
| 55-34143 | 3/1980 | Japan . |
| 55-39279 | 3/1980 | Japan . |
| 63-185423 | 8/1988 | Japan . |
| 880469 | 10/1961 | United Kingdom . |

*Primary Examiner*—Matthew O. Savage
*Attorney, Agent, or Firm*—Michael A. Painter

[57] ABSTRACT

A filter assembly has a filter support means which axially receives a coreless filter element which is constructed of recyclable materials.

11 Claims, 2 Drawing Sheet

U.S. PATENT DOCUMENTS

| | | | |
|---|---|---|---|
| 5,028,323 | 7/1991 | Gould | 210/232 |
| 5,096,575 | 3/1992 | Cosack | 210/94 |
| 5,108,599 | 4/1992 | Lowery | 210/232 |
| 5,114,572 | 5/1992 | Hunter et al. | 210/120 |
| 5,130,023 | 7/1992 | Feint | 210/493.2 |
| 5,211,846 | 5/1993 | Kott et al. | 210/497.2 |
| 5,250,179 | 10/1993 | Spearman et al. | 210/493.2 |
| 5,252,207 | 10/1993 | Miller et al. | 210/335 |
| 5,350,515 | 9/1994 | Stark et al. | 210/493.2 |
| 5,374,355 | 12/1994 | Habiger et al. | 210/493.2 |
| 5,413,712 | 5/1995 | Gewiss et al. | 210/457 |
| 5,476,585 | 12/1995 | Mills | 210/232 |
| 5,527,452 | 6/1996 | Grigoriev et al. | 210/315 s |

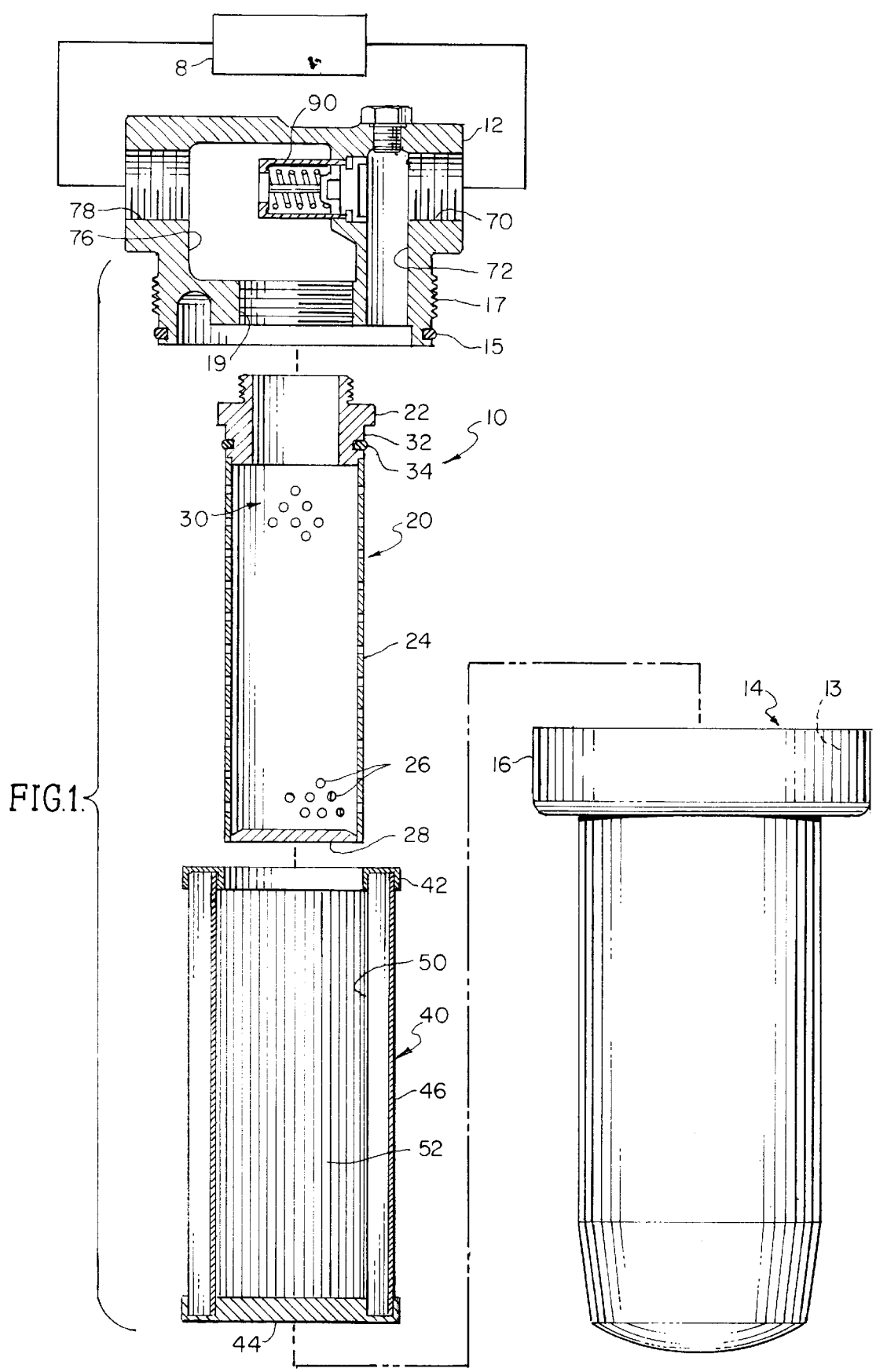

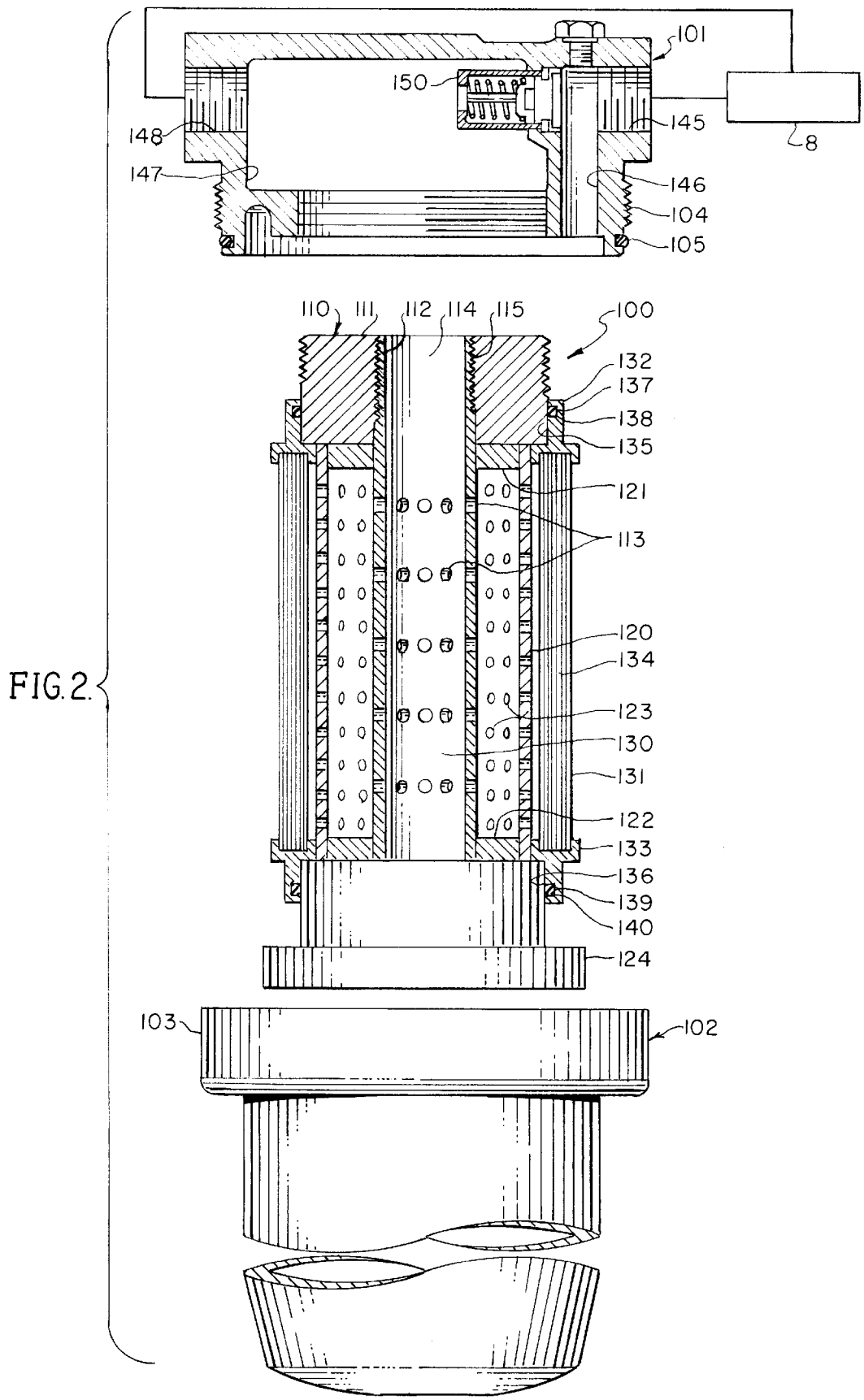

FILTER ASSEMBLY INCLUDING A DISPOSABLE CORELESS FILTER ELEMENT

This is a continuation-in-part of application Ser. No. 499,997 filed Jul. 10, 1995, now abandoned.

TECHNICAL FIELD

The present invention relates to a filter element which has a quick change capability and also has low environmental impact. The filter element is installed in a filter assembly which has a support core which remains affixed to a housing of the filter assembly wherein the filter element is axially positioned over the support core.

BACKGROUND OF THE INVENTION

Fluid filtration systems are typically used in such fluid circulating systems as hydraulic, lubrication, and water systems. The filtration systems primarily comprise a reservoir for the fluid, a pump device to pump the fluid out from the reservoir under pressure and at least one filter assembly. The fluid is continually filtered through a suitable filtration medium to remove unwanted residues or impurities. For example, liquid filtration systems used for filtering the lubricating oil of an internal combustion engine generally have a filter assembly which contains a replaceable filter element comprising a suitable filtration medium. The oil enters the filter assembly through an inlet, passes through the filtration medium and exits through an outlet back into the engine/reservoir.

One problem is that the currently available replaceable filter element is typically made of metal components which create waste disposal problems after use. Filter elements containing metal components are generally regarded by the Environmental Protection Agency as a hazardous material and must be disposed of according to stringent EPA regulations. This disposal problem causes industry great expense and contributes to further waste in toxic landfills. Further, the metal filter elements are expensive to manufacture and are costly to ship, due to their weight.

Accordingly, it is an object of the present invention to provide a filter assembly which mitigates or eliminates the above problems encountered with conventional fluid filter systems.

Another object of the present invention is to provide a filter assembly having a disposable filter element which can easily be disposed of or recycled in an environmentally safe manner.

DESCRIPTION OF THE INVENTION

According to one aspect of the present invention, a disposable and coreless filter element is installed in a filter assembly.

The present invention provides a disposable coreless filter cartridge or element which has many advantages over the currently used replaceable filter cartridges. The coreless filter element of the present invention contains no metallic components and therefore is not subject to corrosion. The synthetic construction of the coreless filter element makes the coreless filter element lower in weight, easier to handle and less costly to ship. Further, there is no need for additional manufacturing steps, such as plating or welding, involved in the construction of the coreless filter element itself. The coreless filter element can be made with different types of filtration media having desired micron ratings, shapes and flows.

In the filter assemblies where a coreless filter element is to be used, the filter assembly has a reusable support core which remains a part of the filter assembly housing. The disposable coreless filter element of the present invention is axially installed or mounted over the reusable support core.

In various embodiments of the present invention it is contemplated that currently available filter assemblies can be retrofitted with the reusable support core in order to accept the coreless filter element. When it is time to install a new filter element in the currently available filter assembly, the used filter element, together with a nipple member which attaches the used filter element to the filter assembly, are detached from the filter assembly and discarded. A reusable support core is attached to the filter assembly housing in place of the nipple member. A coreless filter element is then axially disposed over the reusable support core. When it is time to replace the coreless filter element, the reusable support core remains as a part of the filter assembly and only a new coreless filter element is needed.

The coreless filter element provides a further advantage since the currently available filter elements (which have metallic components as part of the filter element) must be disposed of according to EPA regulations. The present invention provides an environmentally safe coreless filter element which has no metallic support tube. Further, the coreless filter element of the present invention contains no materials classified by the EPA as hazardous material. The coreless filter element has plastic components which make the coreless filter element easy to dispose of, by for example, crushing or incinerating in an environmentally safe manner.

Therefore, it is an object of the present invention to provide a filter assembly which minimizes potential component failures and minimizes any down time of a filtration system.

It is further object of the present invention to provide a filter assembly which keeps contaminants from circulating through a fluid circulation system.

It is a further object of the present invention to provide a filter assembly which has a reusable support core and a coreless filter element which provide substantial savings in natural resources and, in particular, metal materials.

It is a further object of the present invention to provide a disposable coreless filter element which is easy and environmentally safe to both manufacture and dispose of after its use.

BRIEF DESCRIPTION OF THE DRAWINGS

FIG. 1 is an exploded, side elevational, partially cross-sectional view of a liquid filter assembly.

FIG. 2 is an exploded, side elevational, partial cross-sectional view of an alternative embodiment of the present invention coreless filter element for use in a filter assembly in accordance with the present invention.

BEST MODE OF CARRYING OUT THE INVENTION

Referring to FIG. 1, a filter assembly 10 generally comprises a filter mount or housing 12 is operatively connected to a fluid circulation system 8. A bowl 14 is operatively connected to the housing 12 by a holder 16 which incorporates threads on an interior surface 13 of the holder 16. The holder 16 threadingly engages an exterior surface 17 of the housing 12. The holder 16 is sealingly engaged to the housing 12 by a sealing means 15 such as an O-ring.

The housing 12 further includes a reusable filter support means 20 operatively connected therewith. The filter support means 20 comprises a nipple portion 22 operatively connected to a hollow support core or tube 24 which extends axially into the bowl 14. The core 24 has a plurality of openings 26 radially extending therethrough. A base or end cap 28 is in opposing relationship to the nipple portion 22 and sealingly engages the core 24. The core 24 and the nipple portion 22 define a passageway 30 for receiving filtered fluids. It is to be understood that while the reusable filter support means 20 is shown in the embodiment herein as being threadingly engaged within or press fit to a part of the housing 12, it is within the contemplated scope of the present invention that the filter support means 20 can be formed as an integral part of the housing 12. In both embodiments, the filter support means 20 remains with the filter assembly 10 and is not normally replaced when a coreless filter element 40 is axially installed thereon, as will be explained in detail below.

In various embodiments, the filter support means 20 can define an annular recess 32 for receiving a sealing means 34 such as an O-ring. When the coreless filter element 40 is positioned in the filter assembly 10, the sealing means 34 sealingly engages the coreless filter element 40 within the filter assembly 10.

It is to be understood that in preferred embodiments the coreless filter element 40 is made of disposable type plastic materials including polypropylene and the like. In preferred embodiments, the filter element 40 is made of melt bondable materials and contains no metallic elements.

The filter element 40 generally comprises a first end cap 42 an opposing or second end cap 44 which are sealingly engaged on at least one filtration medium 46. In the embodiment shown the first end 42 is open and the second end 44 is closed. However, it should be understood that in other embodiments both ends can be open and the support core 24 can be sealed with the end 28 which still prevents any unfiltered fluid from passing through the filter assembly 10 without first passing through the filter element 40.

In a preferred embodiment the filtration medium 46 of the filter element 40 defines a hollow annularly extending cylinder. In a preferred embodiment, the filtration medium 46 generally comprises a plurality of layers 50 of circumferenially extending pleated filtration medium sealed at a seam 52. However, it should be understood that it is within the contemplated scope of the present invention that other types of filtration media, which may be, for example, non-pleated filtration media are useful in the present invention. It is to be further understood that the filtration media and/or the individual layers of the filtration media may vary in thickness and/or type of material. Such variations are dependent, in part, upon the type of fluid being filtered and other such operating parameters. All such variations are contemplated as being within the scope of the present invention. The filtration medium 46 is suitably sealed such that there are no leaks or passageways through the filtration medium other than through microscopic pores in the layers 50 of the filtration medium 46 itself. In preferred embodiments, the end caps 42 and 44 are sealingly engaged on the filtration medium 46. The end caps 42 and 46 and the seam 52 of the filtration medium 46 are sealed so that there is no opening for the contaminated fluid to pass into the annular passageway 30 without passing through the filtration medium 46.

Various methods for sealing the end caps 42 and 44 to the filtration medium 46 and for sealing the seam 52 of the filtration medium 46 include the use of epoxy type glue materials or heat seal bonding of the materials together.

Another sealing method uses ultrasonic technology wherein the coreless filter element is subjected to vibrations caused by ultrasound waves at a certain frequency in order to develop heat. The heat generated fuses the polymers which make up the filtration medium. In other embodiments, it is also contemplated that spin welding technology and/or radiation frequency technology are also useful to seal the filtration medium and end caps.

In operation, there is upstream pressure as fluid flows through the coreless filter element 40. The core 24 prevents collapse of the filtration medium 46 in a direction toward the passageway 30 within the core 24 when the filter assembly 10 is in use.

The coreless filter element 40 is axially positioned over the filter support means 20. It will be noted that the filter support means 20, comprising the nipple portion 22 and the core 24, are a "permanent" fixture of the filter assembly 10 and remain a part of the filter assembly when the coreless filter element 40 is to be replaced. It is within the contemplated scope of the present invention that currently available filter assemblies can be supplied with the reusable filter support means 20 such that the coreless filter element 40 can be installed into currently existing filter assemblies. For example, in existing filtration assemblies, a conventional filter element mounting (not shown) can be replaced with the filter support means 20 comprising the nipple member 22 and the support core 24.

The housing 12 further defines an inlet passageway 70 which is in communication with an annular passageway 72 in the housing 12. The passageway 72 is in communication with the bowl 14 such that fluid flows from the passageway 70 through passageway 72 into bowl 14. The fluid then passes through the filter element 40 and through the openings 26 in the support core 24 of the filter support means 20. The passageway 30 in the filter support means 20 is in communication with at least one further passageway 76 in the housing 12. The annular passageway 76 is in communication with an outlet passageway 78.

It is also to be understood that in certain preferred embodiments a relief valve means 90 extends within the annular passageway 76 in order to prevent undesired pressure drop from occurring in the use of the filter assembly. If the filter is clogged or plugged due the filtering action, the relief valve means 90 opens such that fluid which cannot pass through the filter media is able to pass through the filter assembly and back into the fluid circulation system. Unfiltered fluid passes through the fluid assembly to prevent any damage to the fluid circulation system which would be caused by an undesirable drop in fluid pressure. However, during a normal filtering operation the fluid passes through the passageways 70 and 72, through the filtration element 40, through the openings 26 in the support core 22 and into the passageway 30, through the passageway 76, and out through the passageway 78 to the fluid circulation system 8.

It is to be understood that various microprocessing and fluid condition electronics can be operatively connected to the filter assembly to optimize the filter operation.

An alternative embodiment of the present invention coreless filter element is shown in FIG. 2 wherein the filter assembly is generally designated by the reference numeral 100. In the embodiment of the present invention shown in FIG. 2, filter assembly 100 comprises a housing 101 operatively connected to the fluid circulation system 8. A bowl 102 is adapted to be operatively connected to a holding member 103 which incorporates screwthreads about the interior surface which are adapted to engage screwthreads 104 disposed about the exterior surface of housing 101. Holder 103 is sealingly engaged to housing 101 by sealing means 105 typically in the form of an O-ring.

The housing 101 includes a reusable filter support means 110 operatively connected therewith. The filter support means 110 includes a cover nipple 111 secured to a cylindrical center post 112 which is axially aligned with housing 101 and axially disposed within bowl 102. Center post 112 includes a plurality of radially extending apertures 113, the function of which will be described in detail hereinbelow.

Cover nipple 111 includes an axial bore 114 which is threaded to engage mating screwthreads 115 formed in the outer surface of center post 112. Housing 101 further includes a cylindrical support core 120 which is annularly disposed about center post 112. The concentric positioning between support core 120 and center post 112 is maintained by annular spacing members 121 and 122 positioned intermediate center post 112 and support core 120. Support core 120 has a plurality of openings 123 disposed through the cylindrical wall thereof. A head nipple 124 is placed in axial abutment to center post 112 and support core 120 in opposing relationship to cover nipple 111.

The axial bore 114 through center post 112 and cover nipple 111 define a channel 130 for receiving filtered fluids. As will be explained in detail hereinbelow, filter support means 110 is not normally replaced when a coreless filter element 131 is installed thereon. Filter element 131 generally comprises a first end cap 132, an opposing or second end cap 133, both of which are sealingly engaged to filtration medium 134. In the embodiment of the present invention shown in FIG. 2, first and second end caps 132 and 133 are axially mounted on opposing ends of filtration medium 134. Each of the end caps 132 and 133 define a cylindrical inner surface 135 and 136, respectively. Cylindrical surface 135 is adapted to be slidably engaged about the outer surface of cover nipple 111. In a like manner, the interior surface 136 of second end cap 133 is adapted to be slidably engaged about the outer surface of head nipple 124. An annular recess 137 is disposed into inner surface 135 of first end cap 132 for receiving sealing means 138 in the form of an O-ring. Similarly, an annular recess 139 is disposed into inner surface 136 of second end cap 133 for receiving sealing means 140 in the form of an O-ring. When coreless filter element 131 is positioned in the filter assembly 100 as shown in FIG. 2, O-rings 138 and 140 securely engage the outer surfaces of cover nipple 111 and head nipple 124, respectively.

When sealed by O-ring 138 and 140, unfiltered fluid will be prevented from passing through filter assembly 100 without first passing through filter element 131 and its incorporated filtration medium 134. Filtration medium 134 and the means used for sealing end caps 132 and 133 thereto are identical to that discussed with respect to the embodiment shown in FIG. 1 and are incorporated herein by this reference.

As explained with respect to the embodiment disclosed in FIG. 1, fluid is caused to flow through coreless filter element 131 as a result of upstream fluid pressure. Support core 120 prevents the collapse of the filtration medium 134 in a direction toward channel 130 when the filter assembly 100 is in use. Coreless filter element 131 is axially positioned about filter support means 110. As discussed hereinabove, filter support means 110 comprises cover nipple 111 and support core 120 which are a permanent fixture of the filter assembly 100 and remain a part of the filter assembly 100 when coreless filter go element 131 is to be replaced.

Housing 101 further defines an inlet passageway 145 which is in communication with fluid input channel 146. Input channel 146 is in communication with the interior of bowl 102 such that fluid flows from inlet passageway 145 through input channel 146 into bowl 102. Pressurized fluid will pass radially inwardly through filter element 131 and through the openings 123 in support core 120. Fluid further passes through apertures 113 in center post 112 into channel 130 which is in communication with at least one chamber 147 which is in communication with annular outlet passageway 148.

As was explained with respect to the embodiment illustrated in FIG. 1, a relief valve 150 may extend within chamber 147 in order to prevent any undesired pressure drop from occurring in the use of the filter assembly. Under normal operation, unfiltered fluid passes through inlet passageway 145 and input channel 146, through filter element 131, through opening 123 of core 120 and apertures 113 of support core 120. Filtered fluid entering channel 130 exits through axial bore 114 and into chamber 147, and out through outlet passageway 148 to the fluid circulation system 8.

It is also appreciated that various modifications to the inventive concepts may be apparent to those skilled in the art without departing from the spirit and scope of the invention.

We claim:

1. A filter assembly including a disposable coreless filter element comprising:

(a) a housing including a fluid inlet passage and a fluid outlet passage;
    (b) a first nipple having a central bore axially disposed therethrough, said first nipple being coupled to said housing, said central bore being in communication with said fluid outlet passage;
    (c) a cylindrical center post having a plurality of apertures radially disposed therethrough axially coupled to said first nipple within said central bore;
    (d) a support core annularly disposed about said center post and having a plurality of openings therethrough;
    (e) a second nipple in axial abutment to said cylindrical center post and said support core in opposition to said first nipple;
    (f) a filter element having first and second opposing end caps sealed thereto, said filter element being annularly disposed about said support core; and
    (g) means for sealing said first and second end caps to said first and second nipples, respectively.

2. A filter assembly as defined in claim 1 wherein said filter element includes a filtration medium comprising a plurality of layers circumferentially extending pleated filtration media sealed at a unitary seam.

3. A filter assembly as defined in claim 2 wherein said filtration medium comprises a cylindrical assembly having an interior wall and an external wall, said internal wall being adjacent said support core.

4. A filter assembly as defined in claim 3 further including a bowl disposed about said filter element and secured to said housing, the external wall of said filtration medium being in communication with the fluid inlet passage.

5. A filter assembly as defined in claim 1 wherein said means for sealing comprise O-rings.

6. A filter assembly as defined in claim 1 wherein said first and second opposing end caps are sealed to said filter element by an epoxy-type glue.

7. A filter assembly including a disposable filter element and a housing therefor comprising:

(a) a housing including a fluid inlet passage and a fluid outlet passage;

(b) a cover nipple having a cylindrical outer surface and an axially disposed central bore, said cover nipple being coupled to said housing, said central bore being in communication with said fluid outlet passage;

(c) a cylindrical center post having inner and outer surfaces and upper and lower ends, said inner surface defining an interior channel and including a plurality of apertures disposed from the interior surface to the exterior surface, the upper end of said center post being coupled to said cover nipple within the central bore;

(d) an annular support core uniformly disposed about said center post and having inner and outer surfaces and upper and lower ends, said upper end being disposed adjacent said cover nipple and including a plurality of apertures disposed through support core from said inner surface to said outer surface;

(e) a head nipple having a cylindrical outer surface disposed adjacent the lower ends of said center post and support core in opposition to said cover nipple;

(f) a filter element comprising a cylindrical filtration medium having inner and outer surfaces and upper and lower ends and first and second annular end caps, each of said first and second end caps having a cylindrical interior surface adapted to slidably engage the cylindrical outer surface of the cover nipple and head nipple, respectively, said first and second end caps being coupled to the upper and lower ends of said filtration medium respectively;

(g) first sealing means being disposed intermediate the cylindrical interior surface of said first end cap and the cylindrical outer surface of said cover nipple for restricting the passage of fluid therebetween;

(h) second sealing means being disposed intermediate the cylindrical interior surface of said second end cap and the cylindrical outer surface of said head nipple for restricting the passage of fluid therebetween; and (i) an enclosure disposed about said filter element and head nipple and coupled to said housing, the outer surface of the filtration medium being in operative communication with the fluid inlet passage.

8. A filter assembly as defined in claim 7 wherein said first and second sealing means comprise O-rings.

9. A filter assembly as defined in claim 7 wherein said filtration medium comprises a plurality of layers of circumferentially extending pleated filtration media sealed at a unitary seam.

10. A filter assembly as defined in claim 7 wherein said first and second end caps are coupled to said filtration medium by an epoxy-type glue.

11. A filter assembly as defined in claim 7 wherein said filtration medium comprises melt-bondable polymers.

* * * * *

UNITED STATES PATENT AND TRADEMARK OFFICE
CERTIFICATE OF CORRECTION

PATENT : 5,984,109
DATED : Nov. 16, 1999
INVENTOR(S) : Suri Kanwar, et al.

It is certified that error appears in the above-identified patent and that said Letters Patent is hereby corrected as shown below:

On the title page, item [75] the first inventor's name should read as follows:
"Kanwar Suri"

Signed and Sealed this

Twenty-third Day of May, 2000

Attest:

Q. TODD DICKINSON

*Attesting Officer*   *Director of Patents and Trademarks*